United States Patent [19]
Reynaud et al.

[11] Patent Number: 5,909,480
[45] Date of Patent: Jun. 1, 1999

[54] SELF-CONTAINED APPARATUS AND METHOD OF MONITORING TELECOMMUNICATIONS EQUIPMENT

[75] Inventors: Alan E. Reynaud; Robert Churchill, Jr., both of San Jose; Sandra Guzman, Santa Clara; Daksha Amin, Sunnyvale; Alan J. Zeringue, San Jose, all of Calif.

[73] Assignee: Siemens Information and Communication Networks, Inc., Boca Raton, Fla.

[21] Appl. No.: 08/808,208

[22] Filed: Feb. 28, 1997

[51] Int. Cl.⁶ ............................. H04M 1/24; H04M 3/08; H04M 3/22
[52] U.S. Cl. ................................. 379/1; 379/10; 379/26; 379/33; 379/43
[58] Field of Search .................................. 379/1, 10, 14, 379/16, 17, 26, 27, 33, 307, 322, 323, 413, 2, 40, 9, 12, 15, 22–24, 37, 42–43, 265, 266, 324; 340/506, 644; 455/9, 14, 67.7

[56] References Cited

U.S. PATENT DOCUMENTS

| | | | |
|---|---|---|---|
| 4,654,640 | 3/1987 | Carll et al. | 340/568 |
| 5,136,281 | 8/1992 | Bonaquist | 340/644 |
| 5,160,851 | 11/1992 | McAndrews | 379/413 |
| 5,426,688 | 6/1995 | Anand | 379/10 |
| 5,528,661 | 6/1996 | Siu et al. | 379/27 |
| 5,572,189 | 11/1996 | Yamamoto et al. | 340/506 |

*Primary Examiner*—Curtis A. Kuntz
*Assistant Examiner*—Rexford N Barnie

[57] ABSTRACT

An apparatus for monitoring a telecommunications system includes a detachable communications module, such as a modem, connected to a call line that is independent of the system to be monitored. A controller is connected to the monitored system and to the communications module. The controller includes at least one detector for sensing various off-normal conditions relevant to operating the monitored system. The controller also includes an auto-dialer that is responsive to the detectors for triggering a call to a remote site via the telecommunications module upon sensing the presence of one of the off-normal conditions. A backup power source is connected to power the controller and the communications module if a primary power source fails. Preferably, the backup source includes at least one battery and the backup source, the controller, and the communications module are contained in a housing that is separate from the monitored system. Inputs to the preferred self-contained unit include a cable from a telecommunications switch (e.g., CBX) and ancillary inputs from equipment such as servers and alarm equipment. A service port is included to allow on-site diagnostic servicing and reprogramming of either or both of the monitored system and the monitoring unit. Non-volatile memory is included and can be upgraded locally using the service port or remotely using the communications module. Because the communications module is detachable, the module can be upgraded as desired, without affecting the implementation of the controller logic and circuitry.

20 Claims, 4 Drawing Sheets

SELF-CONTAINED APPARATUS AND METHOD OF MONITORING TELECOMMUNICATIONS EQUIPMENT

BACKGROUND OF THE INVENTION

The invention relates generally to devices and methods for monitoring a telecommunications system and more particularly to notifying a remote call service center of an off-normal condition detected at the system.

DESCRIPTION OF THE RELATED ART

Businesses that require support of a number of telephones and/or data transmission devices often purchase or lease a computerized branch exchange (CBX). Reliable operation of the telecommunications equipment is important to the operations of many of these businesses. On-site monitoring devices may be used to detect and report conditions which may impact the telecommunications equipment.

The monitoring device may simply be a theft alarm system. U.S. Pat. No. 4,654,640 to Carll et al. describes a security system for use with a digital signal private branch exchange (PBX). A number of electronic tethers are connected to individual pieces of protected equipment, such as personal computers. When the protected equipment is in place, a continuous electrical loop is formed from the protected equipment to the security system. However, removal of a tether connection is automatically detected by a local security monitor, which reports the condition to a central security controller via the PBX. An audible alarm is triggered at the site of the equipment and a dial-up report to security personnel is initiated.

The Carll et al. system monitors the presence or absence of equipment. A more sophisticated device is one in which conditions relevant to operation of telecommunications equipment are monitored and reported. For example, monitoring software may be programmed into a CBX to continuously monitor the status of system hardware and software. This self-monitoring capability enhances the likelihood of sustained performance. If an error is detected, a diagnostics program within the CBX may be used to form an alarm message that automatically contacts a remote service center to identify the error. One concern with such a device is that a power failure or other condition that renders the CBX inoperable will disable the monitoring device. An uninterrupted power supply (UPS) capability may be added as a safeguard. Typically, an external UPS requires a separate enclosure and increases the overall cost of the telecommunications system. Another concern with monitoring devices for telecommunications systems involves the periodic need to upgrade the monitoring capability. If an upgrade is to be made to software built into a CBX, there is a potential for conflicts and incompatibilities between the upgraded program modules and the unchanged program modules. If the modem that is used to establish the dial-up communication to the remote service center is to be upgraded, the upgrade often impacts other features, since the printed circuit board or other substrate on which the modem circuitry is seated may also include circuitry for other features. This concern may be alleviated to some degree by providing an external modem, but this remedy separates the monitoring capability from the communications capability.

What is needed is a telecommunications-system monitoring apparatus which facilitates upgrades and which is implemented such that continued and reliable operation of the apparatus is not dependent upon operation of the telecommunications system.

SUMMARY OF THE INVENTION

An apparatus for monitoring a telecommunications system includes a detachable communications module connected to a communications line that is independent of the system to be monitored. In the preferred embodiment, the module is a modem that is connected to a telephone line that is unsupported by the monitored system. The apparatus also includes a controller connected to the monitored system and the communications module. The controller has detector circuitry or software for sensing different off-normal conditions relevant to operating the telecommunications system. If one of the off-normal conditions is sensed, an auto-dialer of the controller is triggered to initiate a call to a remote site via the communications module. A backup power source is connected to power the controller and the detachable communications module in the absence of an input from a primary power source. In the preferred embodiment, the backup power source includes a rechargeable battery that is contained within a housing with the communications module and the controller. Thus, in this embodiment, the apparatus is self-contained.

The controller includes a principal monitor input from a switch of the telecommunications system and preferably includes at least one ancillary monitor input connected to equipment separate from the switch, such as a server or an alarm. In this preferred embodiment, the different inputs allow detection of different off-normal conditions for various pieces of equipment.

The preferred embodiment also includes a service port to the controller. An interface of the controller enables diagnostic service of the telecommunications system via equipment connected to the service port.

The controller further includes programmable non-volatile memory having stored data indicative of parameters for detection of the off-normal conditions and having data indicative of a telephone number to be called via the modem upon detection of an off-normal condition. The call may be directed to a service center and preferably includes identification of the detected condition. The programmable non-volatile memory may be modified in response to upgrade data that is received via the modem.

The method of monitoring the telecommunications system includes connecting the self-contained monitoring unit to the system, sensing off-normal conditions utilizing the controller, and automatically triggering a connection to the remote support facility upon detection of such a condition. The controller initiates the connection via the modem and a communications link that is independent of the monitored telecommunications system. The identification of the system and the identification of the off-normal condition are reported to the service center by means of a coded message. The communications module is detachable, so that upgrades are facilitated. Moreover, the method enables upgrading of the controller by utilizing inputs from the modem. Diagnostic service of the system being monitored and upgrading of the monitoring apparatus can both be performed from a remote site, such as the service center.

DETAILED DESCRIPTION

Figure 1:
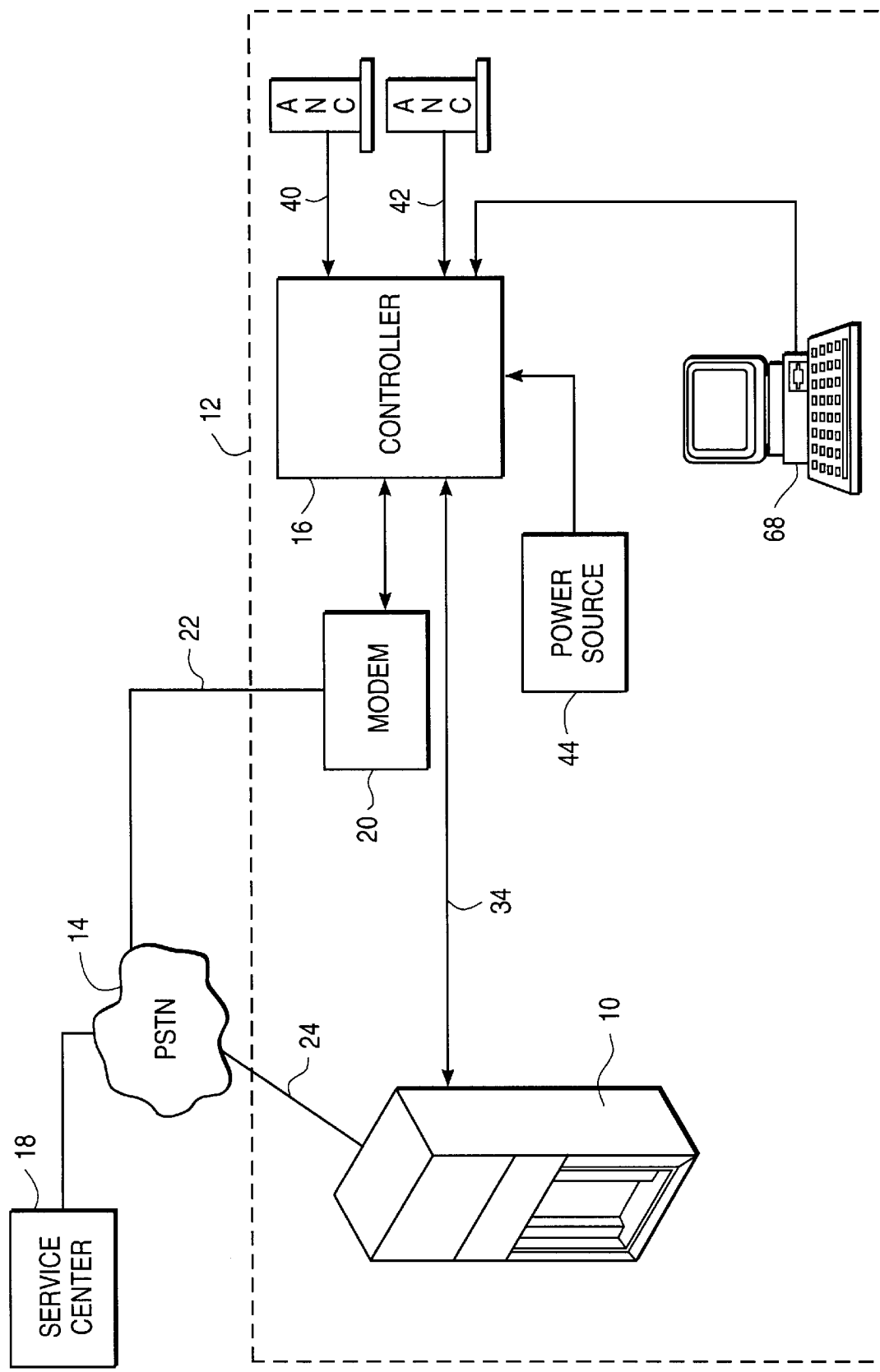
FIG. 1 is a block diagram of an apparatus monitoring a telecommunications system in accordance with the invention.

With reference to FIG. 1, a telecommunications switch 10 is shown as being located at a site 12 of a user. The type of switch is not critical to the invention. The switch may have one or both of analog and digital capability. The use of a computerized branch exchange (CBX) or private branch exchange (PBX) for supporting a number of on-site telephones, not shown, is well known in the art. The switch allows communication among the on-site telephones and communication between an on-site telephone and an off-site telephone via a public switched telephone network (PSTN) 14.

A controller 16 is utilized to provide a tool to maintain and enhance the reliability of the telecommunications system that includes the switch 10. As will be described more fully below, the controller may be connected to a service center 18 via a modem 20. Preferably, the communication between the modem 20 and the service center 18 does not rely upon availability of the switch 10. The modem is shown as being connected to the PSTN 14 by a telephone line 22 that is independent of the leased trunk lines 24 that allow communication between the switch and the PSTN 14. Consequently, the controller 16 will be able to communicate with the service center 18 in a situation in which the switch is disabled. Optionally, the modem 20 may support wireless connection to the service center, so that there is no reliance upon wires.

The controller 16 and modem 20 are used to monitor the on-site conditions that are relevant to proper operation of the telecommunications switch 10. For example, the controller 16 may include a detector that is designed to sense loss of communications with the switch 10, and the loss of power. Sensing these off-normal conditions is achieved without intervention of the switch. An auto-dialer on the controller 16 then triggers the modem 20 to call the service center 18. The modem is a separate module, allowing a modem to be replaced without affecting the hardware and software for monitoring the switch 10. While the component 20 is identified as a "modem," the device may be any type of communications module. Instead of analog modems, ISDN adaptors and wireless data interfaces may be utilized. Since the upgrade of the modem is independent of the site-monitoring operations, the modem may be replaced with a communications device that employs a different technology, as desired.

Figure 2:
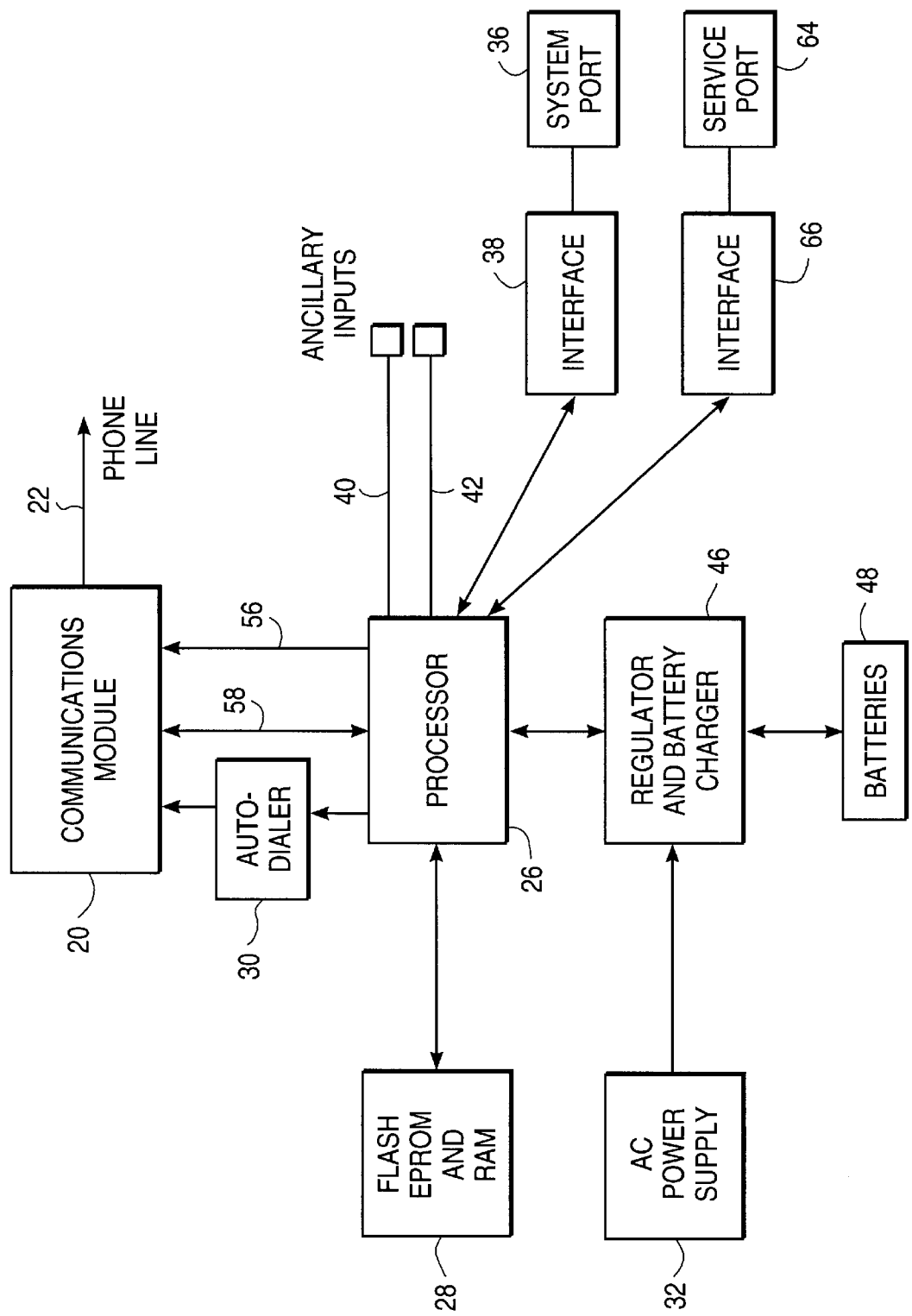
FIG. 2 is a block diagram of the monitoring apparatus of FIG. 1.

Referring now to FIGS. 1 and 2, the controller and modem are used to provide an automatic distress call-out. The feature is activated whenever an off-normal condition is detected. In the preferred embodiment, the controller includes a processor 26 and non-volatile memory 28. In FIG. 2, the non-volatile memory is shown as being flash EPROM that is on-board with random access memory (RAM). For example, 64 Kbytes of flash EPROM may be utilized. This non-volatile memory contains the firmware that is general to all users, and includes some user-defined parameters. The data may be written by the processor 26, facilitating updates and upgrades of firmware and configuration parameters.

The temporary data for executing the monitoring operation may be stored at the on-board RAM of memory 28. Sixty-four Kbytes of RAM may be utilized. In order to provide faster execution of the monitoring operation, code may be downloaded from the flash EPROM. Additionally, code may be uploaded to the flash EPROM during upgrades of the firmware.

In the preferred embodiment, the controller 16 of FIG. 1 waits a specified delay and then dials a designated number. The delay and the number are stored at the flash EPROM 28 in FIG. 2. The processor initiates the call to the service center 18 utilizing an auto-dialer 30. Auto-dialers for triggering a modem/communications module 20 are typically implemented in communications software and are well known in the art. When the communication is established between the modem/communications module 20 and the service center 18, a special key is sent to the service provider. The monitoring apparatus then waits for a specific acknowledgment. When the acknowledgment is received, the modem terminates the connection and returns to normal operation.

The types of conditions that are monitored by the apparatus are not critical. However, four conditions that are preferably monitored are: (1) a failure of the AC mains or the power supply adaptor, (2) the system interface going inactive, (3) the cable to the switch being disconnected, and (4) an external alarm input being activated. Each of the conditions will cause a unique message to be transmitted to the service center 18, so that service personnel will be alerted to the source of an off-normal condition, as well as the location of the telecommunications system that has transmitted the call-out.

The parameters for determining conditions in which a call-out will be initiated may be stored in the non-volatile memory 28. Also stored at the non-volatile memory are the codes for identifying the site 12 and the type of off-normal condition that has been detected. When an AC supply voltage falls below a preselected threshold, a distress message is transmitted to the service center 18. The determination of the AC level may be made by connection to the switch 10, or may be sensed by monitoring an AC power supply 32 that is connected to a source. For example, the AC power supply 32 may be wall mounted. If the voltage level falls below the threshold (e.g., 96 volts on the AC mains), a call-out is triggered. Thus, a low lying voltage as well as adaptor failures may be detected. The distress message may have an "A" appended to it to signify an AC failure has occurred.

In FIG. 1, a cable 34 is shown as being connected from the switch 10 to the controller 16. The cable is attached to a system port 36 in FIG. 2. A system interface 38 is positioned between the port and the processor 26. A DTR signal from the switch 10 is defined to always be in a logical "on" state when the switch is available. The signal changes to a logical "off" state if the switch 10 fails. As a result, a distress call-out with the letter "D" appended to the message is made to the service center 18.

The cable 34 from the controller 16 to the switch 10 may be a RS232 cable having a Pin 11 that is wired to pull the line to electrical ground while the cable is connected to the system port 36. If the cable 34 becomes detached, the signal is pulled "high" internal to the monitoring apparatus. This triggers a distress condition and a call-out message having the letter "R" appended to the message.

The processor 26 of FIG. 2 includes a pair of ancillary inputs 40 and 42. In one embodiment, the inputs are general purpose inputs designated to be activated by a dry contact in a device that initiates a change in state at one of the ancillary inputs. Dry contact relays are often provided on servers, such as voice mail servers or wireless transmission servers. In another embodiment, the ancillary inputs are connected to alarm systems, such as a fire alarm system or a burglar alarm system. Preferably, contact bounce of the relays is eliminated in firmware. Moreover, protection circuits on the alarm inputs should be provided to protect the monitoring apparatus from accidental exposure to electrostatic discharge. Such protection circuits are often used to reduce susceptibility of other circuitry to noise.

Another feature of the invention is the use of backup power capability. In FIG. 1, a power source 44 is shown as being connected to the controller 16. This power source consists of three components, as shown in FIG. 2. Firstly, the AC power supply 32 is a wall-mounted member that provides an input to a regulator and battery charger 46. An AC-to-DC adaptor may be provided at the AC power supply, or may be part of the regulator circuitry. The adaptor outputs 24 volts DC for powering the monitoring apparatus and the battery charger portion of component 46. The regulator circuitry includes a power-fail detect capability for the sensing of an off-normal condition with regard to power. The detector may sense a power-failed condition from the wall mount adaptor, as well as a failure of the AC mains. The third component is the array of batteries 48 that supplies continuous backup power both for outages of the AC mains and failures of the wall mount power supply 32.

Figure 3:
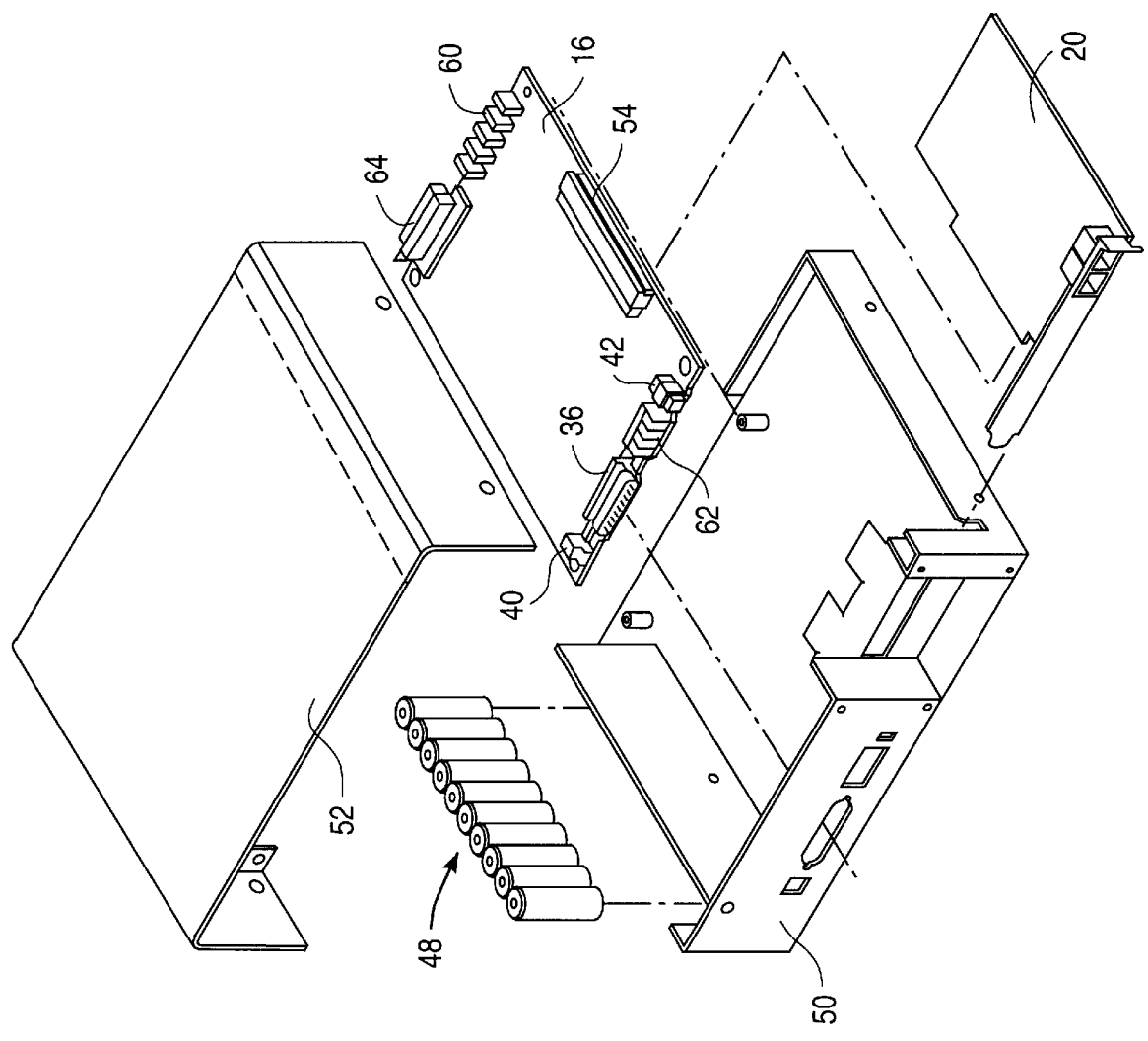
FIG. 3 is an exploded view of the self-contained apparatus of FIG. 2.

Referring briefly to FIG. 3, ten "AA" size Ni-Cad rechargeable batteries 48 are shown. The rechargeable batteries, the controller 16, and the modem/communications module 20 are contained within a housing that includes a base 50 and a cover panel 52. The batteries provide the required power for operation of the controller and the modem for a period of at least fifteen minutes. This time period allows the modem to continue operation if the AC adaptor fails but the AC mains are still functional, or if a power outage occurs. Within this time, several retries of the call may be made if the service center 18 of FIG. 1 is busy. Recharging the batteries requires approximately sixteen hours, using a built-in battery charging circuit.

As shown in FIG. 3, the modem/communications module 20 is a plug-in printed circuit board that connects to a jack 54 of the controller printed circuit board 16. Consequently, a commercially available analog modem, ISDN adaptor, or the like may be used and may be changed, as desired. The connection to the jack 54 provides power and control signals to the communications module. In FIG. 2, the power connections are represented by line 56, while line 58 represents a connection for transmitting control signals to the communications module and receiving any input signals that are transmitted from the service center to the controller.

The monitoring apparatus of FIG. 3 also includes at least one array 60 and 62 of user-status indicators for important signals. The indicators aid a service technician in verifying proper operation of the apparatus, as well as determining the current status.

The preferred embodiment includes a remote software upgrade capability. That is, the modem/communications module 20 may be used to receive software upgrades from the service center 18 or other location. The firmware that is shown as being flash EPROM 28 in FIG. 2 may be upgraded using inputs from the modem.

Software upgrades may also be implemented using a connection to a service port 64 shown in FIGS. 2 and 3. A service interface 66 is located between the service port and the processor 26. On FIG. 1, a computer 68 is connected to the service port. While the computer is shown as being a desktop unit, a laptop computer may be substituted. Typically, the service port is a local RS232 component, but this is not critical.

The service port 64 may be used to provide an alternative to the conventional means of utilizing a remote computer and a modem connection to provide a service call. The computer 68 of FIG. 1 may be programmed to simulate a service center call at the customer site 12. All of the conventional functions available remotely may be available locally through the service port. To prevent interruptions by incoming modem calls, the modem 20 may be controlled to answer calls without user intervention. The callers are informed that the adaptor is in use with a "Local Port in Use" message. The call is then disconnected. This allows a service technician to continue to use a service port uninterrupted.

The availability of the service port 64 connection to the monitoring apparatus provides the same access to operations as is provided by the conventional method of a service center call via the modem 20. Consequently, there is a potential that installation and service of the telecommunications switch will be facilitated. The service port is implemented by multiplexing the data and handshaking signals from the modem 20 with those from the service port connector. When the service technician plugs a computer into the service port, the presence of DTR causes the controller 16 to switch the multiplexers to connect the service port to the telecommunications switch 10. Then, if a call comes into the modem while the service port is in use, the call is handled in the manner described immediately above. The service port connection to the switch 10 is not disturbed during this process. When the service technician disconnects from the service port, the modem returns to normal operation.

Figure 4:
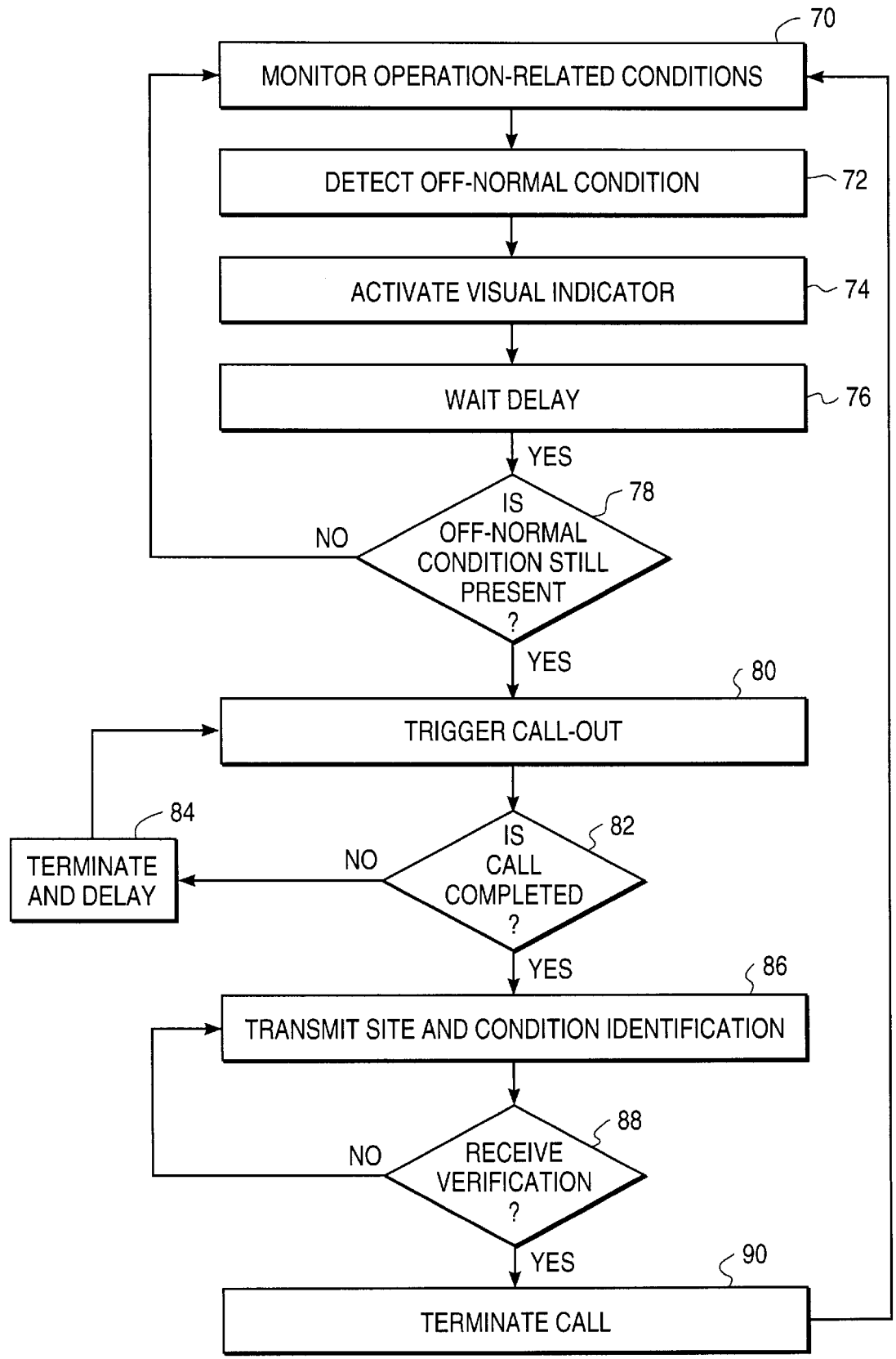
FIG. 4 is a process flow of the steps for monitoring the telecommunications station of FIG. 1.

FIG. 4 illustrates one embodiment of utilizing the monitoring apparatus. In step 70, the process for monitoring operation-related conditions is initiated. The conditions of interest may vary from user-to-user. If an off-normal condition is detected at step 72, the appropriate visual indicator at the panel of the housing will be activated, as shown at step 74. The use of indicators is not critical to the invention, but provides an immediate and localized indication of system status.

The process is controlled by several user-variable timing parameters that may be stored in the non-volatile memory, i.e. flash EPROM. At step 76, a delay is initiated. The delay is determined by access to a first user-programmable register. The delay is intended to eliminate unnecessary call-outs. If the off-normal condition is no longer present after the delay, the process returns to monitoring the operation-related conditions, as shown at decision step 78. On the other hand, if the off-normal condition is still present, the step 80 of triggering a call-out is implemented. The number that is to be called is stored in a second user-programmable register.

If the call fails to complete, as determined at decision step 82, the call attempt is terminated and the apparatus waits a specified time delay 84. The time delay is determined by access of a third user-programmable register. Following the delay, the call-out is again triggered at step 80. The loop consisting of steps 80, 82 and 84 may be repeated a number of times specified by a fourth user-programmable register.

When the call is determined to be completed, a message string stored at a fifth user-programmable register is transmitted. The message identifies the site and the condition that has been determined to be off-normal. In the preferred embodiment, the apparatus then waits for an acknowledgment that the message has been received. For example, a verification may be transmitted from the remote service center as an acknowledgment string that is to be compared to a string in a sixth user-programmable register. As shown in FIG. 4, the message from the monitoring apparatus to the service center is transmitted at step 86 and the apparatus waits for verification at step 88. If the verification is not received, the process returns to step 86 for retransmission of the distress message. On the hand, if the verification is received, the distress call is terminated at step 90 and the apparatus returns to the step of monitoring operation-related conditions. The service center has been notified of the off-normal condition and can take appropriate action.

We claim:

1. An apparatus for monitoring a telecommunications system comprising:
    a detachable communications module connected to a telecommunications line that is independent of said telecommunications system to be monitored;
    a controller connected to a telecommunications switch of said telecommunications system and to said communications module, said controller having detector means for sensing one of a plurality of predefined operational failures of said telecommunications switch, said controller further having an auto-dialer means responsive to said detector means for triggering a call to a remote site via said communications module upon sensing one of said operational failures;
    a primary power source connected to power said controller and said detachable communications module; and
    a backup power source connected to power said controller and said detachable communications module in the absence of said primary power source, said backup power source including at least one battery.

2. The apparatus of claim 1 further comprising a housing enclosing said detachable communications module, said controller and said backup power source.

3. The apparatus of claim 1 wherein said controller includes a principal monitor input connected to said telecommunications switch and includes at least one ancillary monitor input connected to equipment separate from said telecommunications switch.

4. The apparatus of claim 3 wherein said equipment includes a server for a telecommunications service.

5. The apparatus of claim 1 wherein said detachable communications module is a modem on a printed circuit board.

6. The apparatus of claim 5 wherein said controller is contained on a second printed circuit board.

7. The apparatus of claim 1 wherein said detector means is enabled to detect (1) power at said telecommunications system being below a preselected threshold level, and (2) a loss of communication between said controller and said telecommunications system.

8. The apparatus of claim 1 wherein said backup power source is connected to said primary power source to recharge said batteries, and wherein said primary power source is connected to said telecommunications switch to power said switch.

9. The apparatus of claim 1 further comprising a service port to said controller, said controller including an interface means connected to said service port for enabling diagnostic service of said telecommunications system via equipment connected to said service port.

10. The apparatus of claim 1 wherein said controller includes programmable non-volatile memory having stored data indicative of parameters for detection of said plurality of operational failures of said switch and having call information indicative of a telephone number to be called via said communications module upon detection of one of said operational failures, said controller further having means for modifying said programmable non-volatile memory in response to upgrade data received via said communications module.

11. An apparatus for monitoring conditions related to operations of a telecommunications switch comprising:
    a housing;
    a modem removably contained within said housing, said modem including means for transmitting and receiving data to and from a remote site;
    an auto-dialer contained within said housing and connected to said modem to initiate a call in an absence of user intervention;
    a detector contained within said housing and connected to said telecommunications switch to detect an operational failure of said switch, said auto-dialer being responsive to said detector when said operational failure is detected;
    non-volatile memory contained within said housing, said non-volatile memory having stored parameters indicative of at least one said operational failure of said switch; and
    processor means contained within said housing and connected to said non-volatile memory for updating stored data in response to input signals from equipment exterior to said housing.

12. The apparatus of claim 11 wherein said input signals for updating said stored data are received by said processor means via said modem.

13. The apparatus of claim 11 wherein said detector has a first monitor input connected to said switch and includes a plurality of auxiliary monitor inputs connected to equipment related to but separate from said switch.

14. The apparatus of claim 11 wherein said stored parameters of said non-volatile memory include parameters related to power to said switch and availability of said switch.

15. The apparatus of claim 11 further comprising at least one backup battery contained within said housing.

16. A method of monitoring a telecommunications system located at local site comprising steps of:

connecting a self-contained monitoring unit to said system, said unit having a detachable communications module and a controller;

charging a backup battery supply within said unit using a primary power source for operating said unit;

sensing a system malfunction occurring at said local site utilizing said controller;

automatically triggering a connection to a remote support facility upon detection of said system malfunction, including utilizing said controller to initiate said connection via said communications module and a communications link that is independent of said system;

identifying said detected system malfunction to said remote support facility by means of said communications module and a coded message indicative of said detected system malfunction.

17. The method of claim 16 further comprising selectively upgrading said controller utilizing inputs from said communications module, said communications module being a modem.

18. The method of claim 16 wherein said step of sensing said system malfunction includes detecting when power to said system drops below a preselected threshold level and detecting when access to said system by said unit is unavailable.

19. The method of claim 16 wherein said step of sensing said system malfunction includes comparing real-time monitored conditions of said system to condition parameters stored at said controller.

20. The method of claim 16 further comprising a step of diagnosing said system using said unit, including connecting a computing device to said unit and exchanging signals between said system and said unit.

* * * * *